US012798018B2

(12) United States Patent
Lim et al.

(10) Patent No.: US 12,798,018 B2
(45) Date of Patent: Nov. 17, 2026

(54) WORK TABLE FOR LASER PROCESSING AND LASER PROCESSING APPARATUS

(71) Applicant: Samsung Display Co., LTD., Yongin-si (KR)

(72) Inventors: Jong-Hee Lim, Yongin-si (KR); Eun Su Jun, Yongin-si (KR); Hak-Min Kim, Yongin-si (KR); Hyoung-Joo Kim, Yongin-si (KR); Yong Geun Lee, Yongin-si (KR); Ilyoung Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 539 days.

(21) Appl. No.: 18/452,652

(22) Filed: Aug. 21, 2023

(65) Prior Publication Data

US 2024/0181577 A1 Jun. 6, 2024

(30) Foreign Application Priority Data

Dec. 6, 2022 (KR) ........................ 10-2022-0168473

(51) Int. Cl.

*B23K 37/04* (2006.01)
*B23K 26/70* (2014.01)

(52) U.S. Cl.

CPC ........ *B23K 37/0426* (2013.01); *B23K 26/702* (2015.10)

(58) Field of Classification Search

CPC .... B23K 26/702; B23K 26/142; B23K 37/04; B23K 37/0408; B23K 37/0461; B23Q 2703/04; B23Q 3/088

See application file for complete search history.

(56) References Cited

U.S. PATENT DOCUMENTS

2017/0282308 A1* 10/2017 Tymosch ............... B23Q 3/061

FOREIGN PATENT DOCUMENTS

| | | |
|---|---|---|
| CN | 109676267 | 4/2019 |
| KR | 10-2382051 | 4/2022 |

* cited by examiner

*Primary Examiner* — Tyrone V Hall, Jr.
(74) *Attorney, Agent, or Firm* — Womble Bond Dickinson (US) LLP

(57) ABSTRACT

A work table for laser processing include a lower plate including a first area and a second area surrounding at least a portion of the first area, a first plate disposed in the first area on the lower plate and having a polygonal shape in a plan view, and a second plate disposed in the second area on the lower plate and movable in the second area.

19 Claims, 5 Drawing Sheets

WORK TABLE FOR LASER PROCESSING AND LASER PROCESSING APPARATUS

CROSS-REFERENCE TO RELATED APPLICATION(S)

This application claims priority to and benefits of Korean Patent Application No. 10-2022-0168473 under 35 USC § 119, filed on Dec. 6, 2022, in the Korean Intellectual Property Office (KIPO), the entire contents of which are incorporated herein by reference.

BACKGROUND

1. Technical Field

Embodiments relate to a work table for laser processing and a laser processing apparatus including the same.

2. Description of the Related Art

In manufacturing a display device such as an organic light emitting display device, a liquid crystal display device, or the like, a process of cutting an object into a shape may be performed. This process may be performed using a laser processing apparatus.

The process may be performed by arranging the object on a work table for laser processing and radiating a laser beam to a desired location of the object. A laser unit that radiates the laser beam to the object may be positioned above the work table for laser processing. As the laser unit moves along a cutting line of the object and radiates the laser beam, the object may be cut along the cutting line.

SUMMARY

Embodiments provide a work table for laser processing with improved usability.

Embodiments provide a laser processing apparatus including the work table for laser processing.

A work table according to an embodiment of the disclosure may include a lower plate including a first area and a second area surrounding at least a portion of the first area, a first plate disposed in the first area on the lower plate and having a polygonal shape in a plan view, and a second plate disposed in the second area on the lower plate and movable in the second area.

In an embodiment, the second plate may include a first control plate disposed adjacent to a first side of the first plate extending in a first direction, a second control plate disposed adjacent to a second side of the first plate extending in a second direction intersecting the first direction, a third control plate disposed adjacent to a third side of the first plate facing the first side, a fourth control plate disposed adjacent to a first corner of the first plate where the first side and the second side meet, and a fifth control plate disposed adjacent to a second corner of the first plate where the second side and the third side meet.

In an embodiment, each of the first control plate and the third control plate may be movable in the second direction, the second control plate may be movable in the first direction, the fourth control plate may be movable in a third direction intersecting each of the first and second directions, and the fifth control plate may be movable in a fourth direction intersecting each of the first, second, and third directions.

In an embodiment, the work table for laser processing may further include a third plate disposed adjacent to a side of the second area on the lower plate.

In an embodiment, each of the first, second, third, fourth, and fifth control plates may include an adjusting bolt.

In an embodiment, the adjusting bolt may be connected to the third plate.

In an embodiment, each of the first, second, third, fourth, and fifth control plates may be movable in the second area along the adjusting bolt.

In an embodiment, the first, second, third, fourth, and fifth control plates may include a ruler that guides the first, second, third, fourth, and fifth control plates, respectively.

In an embodiment, a groove may be defined on the second plate.

In an embodiment, the groove may be defined on each of the first, second, third, fourth, and fifth control plates, and may continuously extend along the first, second, third, fourth, and fifth control plates.

In an embodiment, a plurality of first adsorption holes spaced apart from each other may be defined on the first plate.

In an embodiment, a plurality of second adsorption holes adjacent to the first plate and spaced apart from each other may be defined on the second plate.

In an embodiment, the work table for laser processing may further include a chamber disposed inside the lower plate. The chamber may be connected to the plurality of first adsorption holes and the plurality of second adsorption holes.

In an embodiment, the work table for laser processing may further include a discharge passage passing through the lower plate in a thickness direction of the lower plate and disposed in the second area of the lower plate.

In an embodiment, the discharge passage may entirely overlap the groove in a plan view.

A laser processing apparatus according to an embodiment of the disclosure may include a lower plate including a first area and a second area surrounding at least a portion of the first area, a first plate disposed in the first area on the lower plate and having a polygonal shape in a plan view, a second plate disposed in the second area on the lower plate, including a groove, and movable in the second area, and a laser unit that radiates a laser beam along the groove and disposed on the lower plate.

In an embodiment, the second plate may include a first control plate disposed adjacent to a first side of the first plate extending in a first direction, a second control plate disposed adjacent to a second side of the first plate extending in a second direction intersecting the first direction, a third control plate disposed adjacent to a third side of the first plate facing the first side, a fourth control plate disposed adjacent to a first corner of the first plate where the first side and the second side meet, and a fifth control plate disposed adjacent to a second corner of the first plate where the second side and the third side meet.

In an embodiment, each of the first control plate and the third control plate may be movable in the second direction, the second control plate may be movable in the first direction, the fourth control plate may be movable in a third direction intersecting each of the first and second directions, and the fifth control plate may be movable in a fourth direction intersecting each of the first, second, and third directions.

In an embodiment, each of the first, second, third, fourth, and fifth control plates may include an adjusting bolt.

In an embodiment, the first, second, third, fourth, and fifth control plates may include a ruler that guides the first, second, third, fourth, and fifth control plates, respectively.

According to embodiments of the disclosure, a laser processing apparatus may include a work table for laser processing including a plate movable on a lower plate. A groove formed corresponding to a cutting line of a substrate may be defined on the plate. In case that a processing shape of the substrate is changed, a process may be performed by moving the plate according to the changed processing shape. For example, the process may be performed without replacing the work table for laser processing. Therefore, since the work table for laser processing may not be replaced for each processing shape of the substrate, cost loss and processing quality problems due to replacement of the work table for laser processing may be minimized, and efficiency of the process may be improved.

DETAILED DESCRIPTION OF THE EMBODIMENTS

Figure 1:
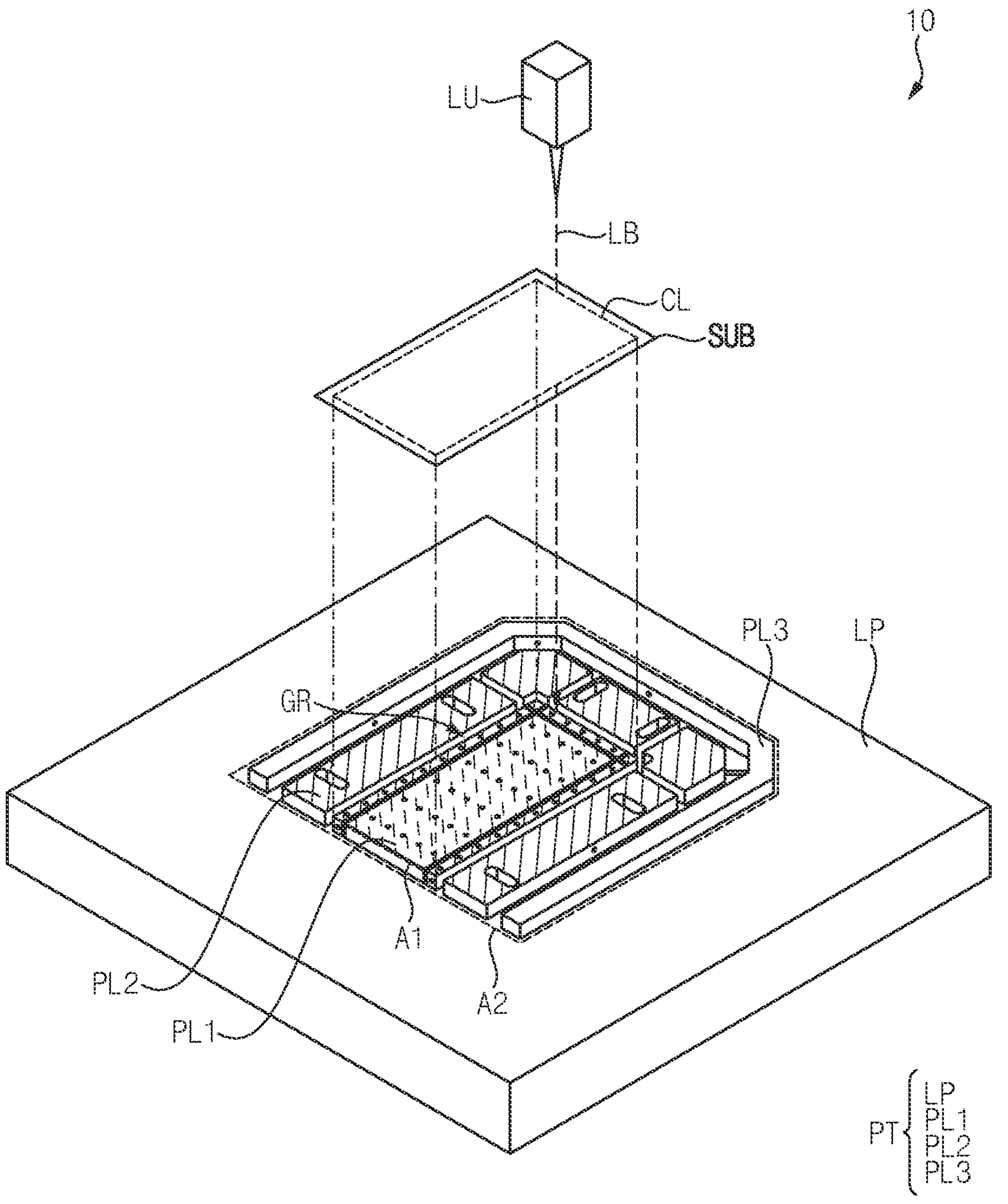
FIG. 1 is a perspective view schematically illustrating a laser processing apparatus according to an embodiment of the disclosure.

Hereinafter, embodiments of the disclosure will be described in more detail with reference to the accompanying drawings. The same reference numerals are used for the same components in the drawings, and redundant descriptions of the same components will be omitted.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a perspective view schematically illustrating a laser processing apparatus according to an embodiment of the disclosure.

Referring to FIG. 1, a laser processing apparatus 10 may include a work table for laser processing PT and a laser unit LU. The work table for laser processing PT may include a lower plate LP, a first plate PL1, a second plate PL2, and a third plate PL3. The first, second, and third plates PL1, PL2 and PL3 may be disposed on the lower plate LP.

A substrate SUB may be seated on an upper surface of the work table for laser processing PT. For example, the substrate SUB may be seated on upper surfaces of the first plate PL1 and the second plate PL2. For example, the first plate PL1 and the second plate PL2 may support the substrate SUB. In an embodiment, the work table for laser processing PT may be fixed. In another embodiment, the work table for laser processing PT may be movable or rotatable in a direction (e.g., predetermined or selectable direction).

The laser unit LU may be disposed on (or above) the work table for laser processing PT. The laser unit LU may generate and radiate a laser beam LB. In an embodiment, the laser beam LB may be a gas laser such as carbon dioxide laser, excimer laser, helium-neon laser, or the like. In another embodiment, the laser beam LB may be a solid-state laser such as ruby laser, glass laser, YAG laser, YLF laser, or the like.

The substrate SUB processed by the laser processing apparatus 10 may have various sizes. The substrate SUB may include a cutting line CL. The laser unit LU may radiate the laser beam LB along the cutting line CL of the substrate SUB. For example, the substrate SUB may be processed along the cutting line CL. Accordingly, the substrate SUB having a shape (e.g., predetermined or selectable shape) may be formed.

The lower plate LP may include a first area A1 and a second area A2 surrounding at least a portion of the first area A1.

The first plate PL1 may be disposed in the first area A1 on the lower plate LP. The first plate PL1 may be fixed. In an embodiment, the first plate PL1 may have a polygonal shape in a plan view. For example, the first plate PL1 may have a rectangular shape in a plan view, but the disclosure is not limited thereto.

The second plate PL2 may be disposed in the second area A2 on the lower plate LP. The second plate PL2 may surround at least a portion of the first plate PL1. In an embodiment, the second plate PL2 may be movable in the second area A2.

A groove GR may be defined on the second plate PL2. The groove GR may be defined corresponding to the cutting line CL of the substrate SUB to prevent damage to the work table for laser processing PT and the substrate SUB by the laser beam LB. Accordingly, the laser beam LB may pass through the cutting line CL of the substrate SUB, and may be radiated to the groove GR.

The third plate PL3 may be disposed in the second area A2 on the lower plate LP. The third plate PL3 may be disposed adjacent to an edge of the second area A2. For example, the third plate PL3 may surround at least a portion of the second plate PL2. The third plate PL3 may be fixed.

Although FIG. 1 illustrates that the work table for laser processing PT is applied to a laser processing of the substrate SUB, the disclosure is not limited thereto. For example, the work table for laser processing PT may be applied to an inspection process using an inspection mark. For example, the movable second plate PL2 may also be applied to the inspection process.

Figure 2:
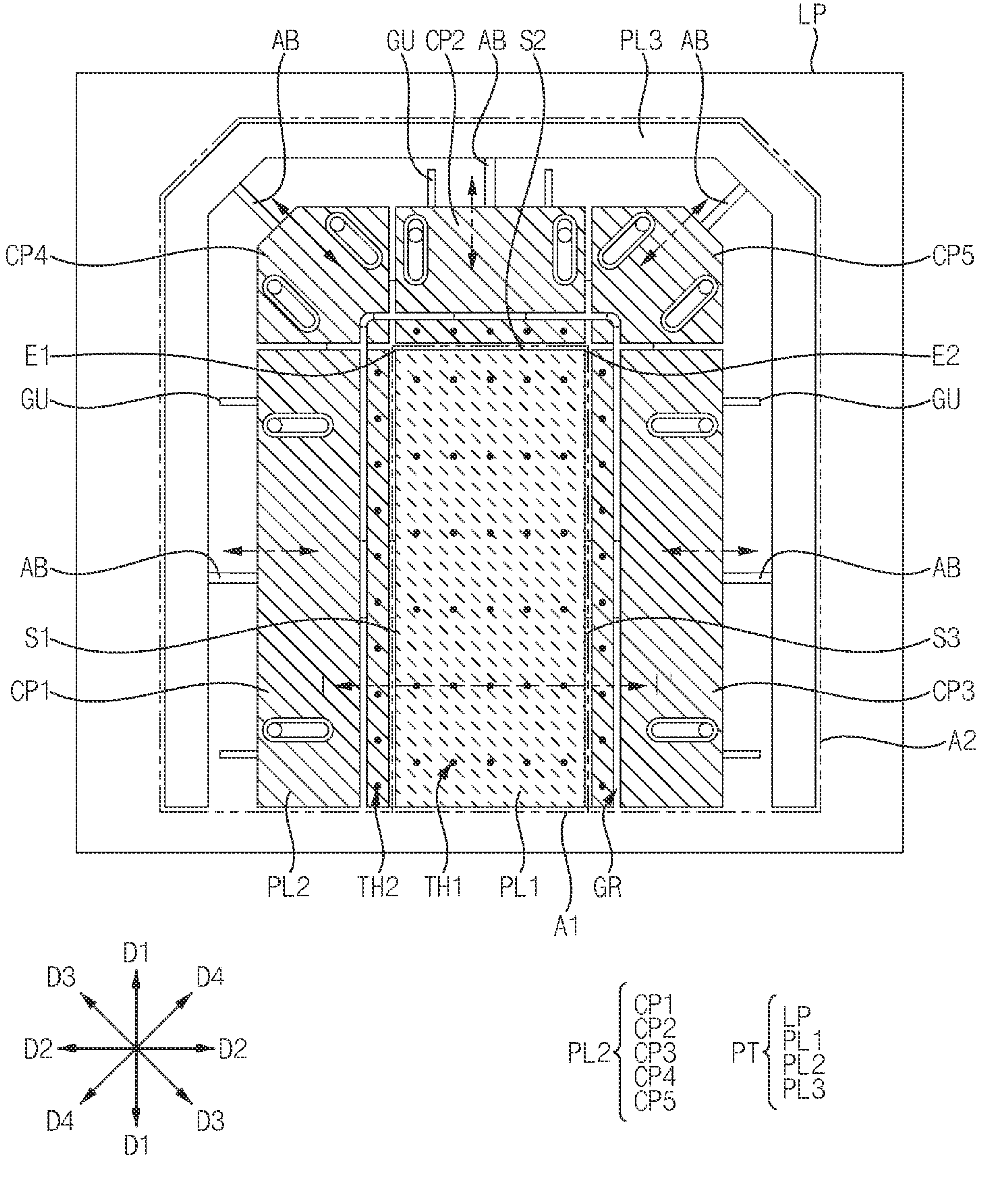
FIG. 2 is a plan view illustrating a work table for laser processing included in the laser processing apparatus of FIG. 1 according to an embodiment.
Figure 3:
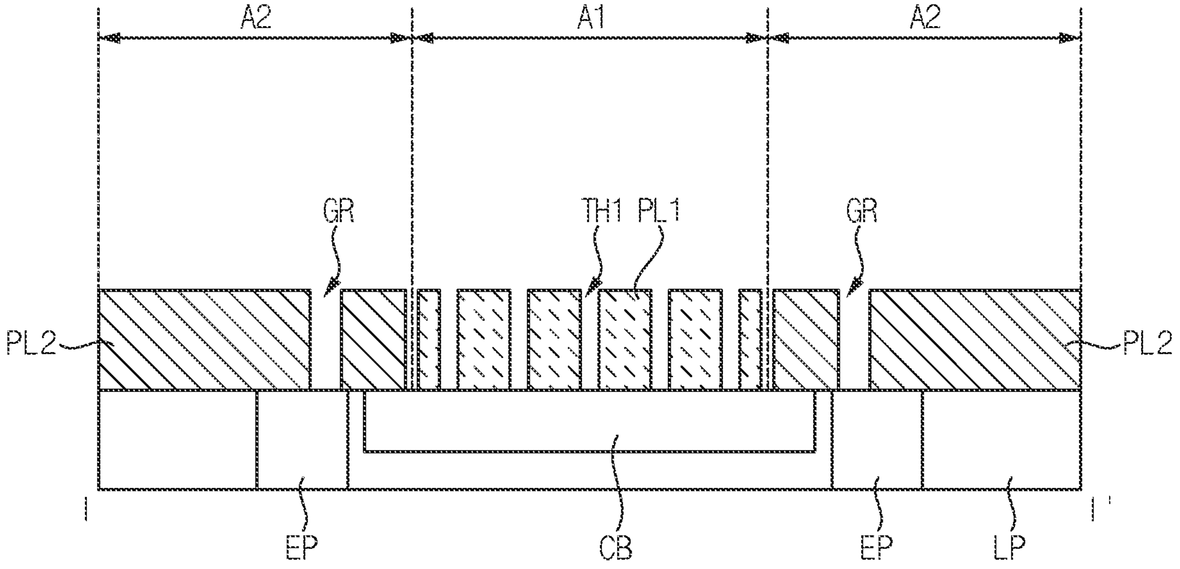
FIG. 3 is a schematic cross-sectional view taken along line I-I' of FIG. 2 according to an embodiment.
Figure 4:
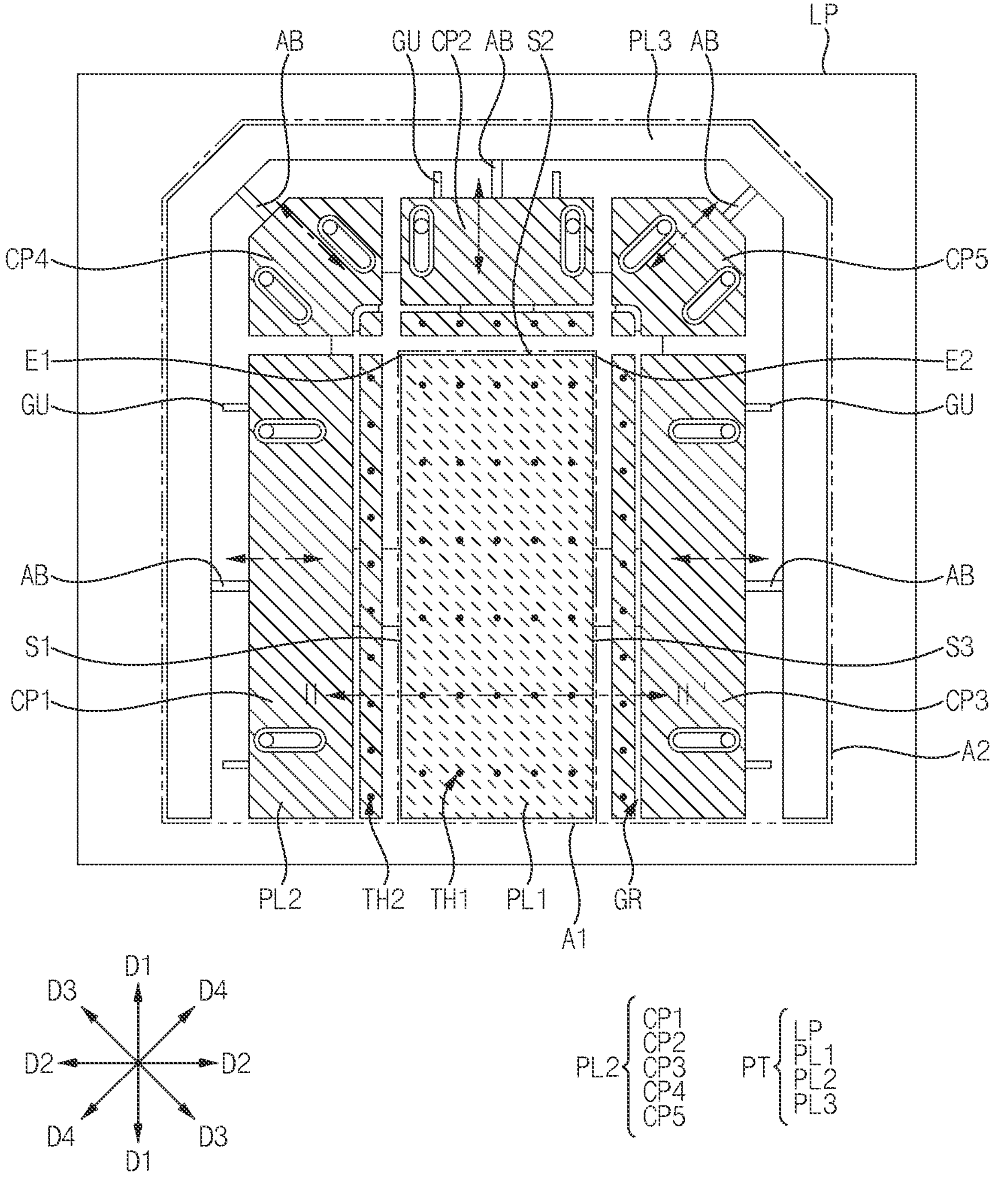
FIG. 4 is a plan view illustrating a state that a second plate included in the work table for laser processing of FIG. 2 is moved according to an embodiment.
Figure 5:
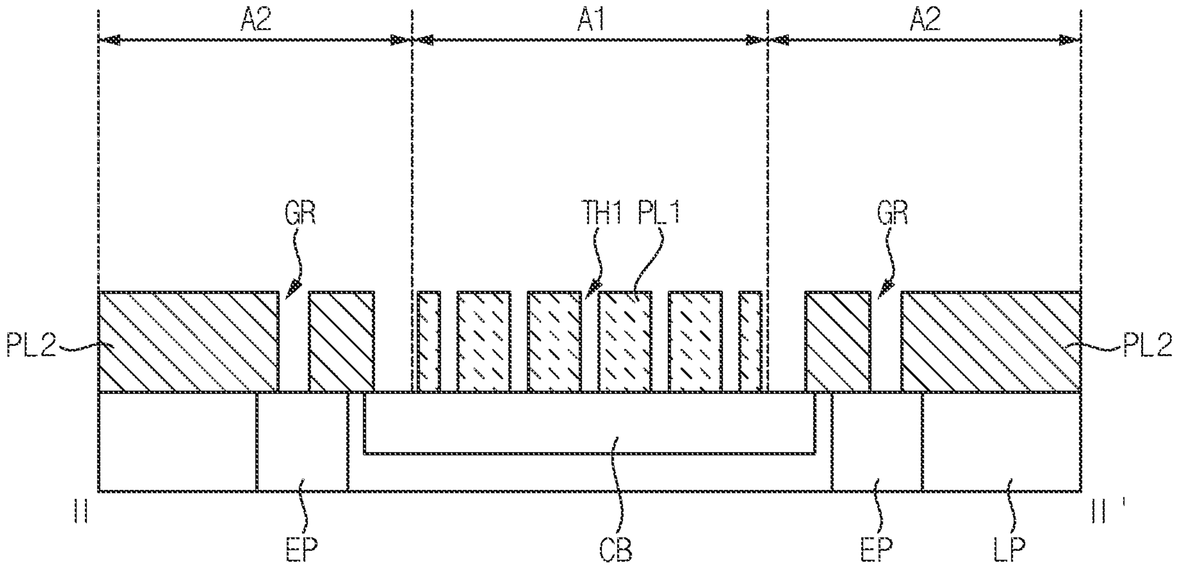
FIG. 5 is a schematic cross-sectional view taken along line II-II' of FIG. 4 according to an embodiment.

FIG. 2 is a plan view illustrating a work table for laser processing included in the laser processing apparatus of FIG. 1 according to an embodiment. FIG. 3 is a schematic cross-sectional view taken along line I-I' of FIG. 2 according to an embodiment. FIG. 4 is a plan view illustrating a state that a second plate included in the work table for laser processing of FIG. 2 is moved according to an embodiment. FIG. 5 is a schematic cross-sectional view taken along line II-II' of FIG. 4 according to an embodiment.

Referring to FIGS. 1 to 5, the work table for laser processing PT may include the lower plate LP, the first plate PL1, the second plate PL2, the third plate PL3, a chamber CB, and a discharge passage EP.

The first, second, and third plates PL1, PL2 and PL3 may be disposed on the lower plate LP.

The first plate PL1 may include a first side S1, a second side S2, a third side S3, a first corner E1, and a second corner E2 in a plan view.

The first side S1 may extend in a first direction D1. The second side S2 may extend in a second direction D2. The third side S3 may face the first side S1. For example, the third side S3 may extend in the first direction D1. The first side S1 and the second side S2 may meet at the first corner E1. The second side S2 and the third side S3 may meet at the second corner E2.

Multiple first adsorption holes TH1 may be defined on the first plate PL1. The first adsorption holes TH1 may be spaced apart from each other. For example, the first adsorption holes TH1 may be arranged in the first direction D1 and the second direction D2. The first adsorption holes TH1 may pass through the first plate PL1 in the thickness direction. The first adsorption holes TH1 may adsorb the substrate SUB seated on the upper surface of the first plate PL1.

The second plate PL2 may surround the first, second, and third sides S1, S2, and S3 and the first and second corners E1 and E2 of the first plate PL1.

The second plate PL2 may include a first control plate CP1, a second control plate CP2, a third control plate CP3, a fourth control plate CP4, and a fifth control plate CP5. In an embodiment, the first control plate CP1 may be disposed adjacent to the first side S1 of the first plate PL1. The second control plate CP2 may be disposed adjacent to the second side S2 of the first plate PL1. The third control plate CP3 may be disposed adjacent to the third side S3 of the first plate PL1. The fourth control plate CP4 may be disposed adjacent to the first corner E1 of the first plate PL1. The fifth control plate CP5 may be disposed adjacent to the second corner E2 of the first plate PL1.

In an embodiment, each of the first control plate CP1, the second control plate CP2, the third control plate CP3, the fourth control plate CP4, and the fifth control plate CP5 may be movable.

For example, the first control plate CP1 may be movable in the second direction D2. The second control plate CP2 may be movable in the first direction D1. The third control plate CP3 may be movable in the second direction D2. The fourth control plate CP4 may be movable in a third direction D3. The fifth control plate CP5 may be movable in a fourth direction D4.

For example, the second plate PL2 may be movable between the first plate PL1 and the third plate PL3 in the second area A2. For example, each of the first, second, third, fourth, and fifth control plates CP1, CP2, CP3, CP4, and CP5 may move in a direction away from the first plate PL1. Each of the first, second, third, fourth, and fifth control plates CP1, CP2, CP3, CP4, and CP5 may move in a direction away from the third plate PL3 (see FIGS. 2 and 4).

Each of the first, second, third, fourth, and fifth control plates CP1, CP2, CP3, CP4, and CP5 may include an adjusting bolt AB. The adjusting bolt AB may be connected to the third plate PL3. In an embodiment, each of the first, second, third, fourth, and fifth control plates CP1, CP2, CP3, CP4, and CP5 may move in the second area A2 along the adjusting bolt AB. For example, the adjusting bolt AB may adjust a distance of each of the first, second, third, fourth, and fifth control plates CP1, CP2, CP3, CP4, and CP5 from the first plate PL1 or the third plate PL3. For example, the adjusting bolt AB may extend in a movable direction of each of the first, second, third, fourth, and fifth control plates CP1, CP2, CP3, CP4, and CP5.

Each of the first, second, third, fourth, and fifth control plates CP1, CP2, CP3, CP4, and CP5 may include a ruler GU. The ruler GU may guide each of the first, second, third, fourth, and fifth control plates CP1, CP2, CP3, CP4, and CP5. The ruler GU may prevent the first, second, third, fourth, and fifth control plates CP1, CP2, CP3, CP4, and CP5 from being twisted while moving, respectively. For example, the ruler GU may extend in the movable direction of each of the first, second, third, fourth, and fifth control plates CP1, CP2, CP3, CP4, and CP5.

The groove GR may be defined on each of the first, second, third, fourth, and fifth control plates CP1, CP2, CP3, CP4, and CP5. In an embodiment, the groove GR may continuously extend along the first, second, third, fourth, and fifth control plates CP1, CP2, CP3, CP4, and CP5. For example, the groove GR may continuously extend in the first direction D1 and the second direction D2 to surround the first plate PL1.

Multiple second adsorption holes TH2 may be defined on the second plate PL2. The second adsorption holes TH2 may be spaced apart from each other. The second adsorption holes TH2 may be disposed adjacent to the first plate PL1. For example, the second adsorption holes TH2 may be arranged in the first direction D1 on the first and third control plates CP1 and CP3 and in the second direction D2 on the second control plate CP2. The second adsorption holes TH2 may pass through the second plate PL2 in the thickness direction. The second adsorption holes TH2 may adsorb the substrate SUB seated on the upper surface of the second plate PL2.

The chamber CB may be disposed inside the lower plate LP. In an embodiment, the chamber CB may overlap the first area A1 and the second area A2 in a plan view. The chamber CB may be connected to the first adsorption holes TH1 and the second adsorption holes TH2. The chamber CB may be connected to a vacuum pressure device (not illustrated) disposed outside the lower plate LP.

The vacuum pressure device may provide a vacuum pressure to the chamber CB. The chamber CB may provide an adsorption power to the first and second adsorption holes TH1 and TH2 by providing the vacuum pressure to the first and second adsorption holes TH1 and TH2. For example, the chamber CB may be in a vacuum state, and insides of the first and second adsorption holes TH1 and TH2 connected to the chamber CB may also be in the vacuum state. Accordingly, in case that the substrate SUB is seated on the upper surface of the work table for laser processing PT, the substrate SUB may be fixed to the upper surface of the work table for laser processing PT by the first and second adsorption holes TH1 and TH2. In other words, the substrate SUB may be fixed to the upper surfaces of the first and second plates PL1 and PL2 by the adsorption power provided to the first and second adsorption holes TH1 and TH2, and the first and second adsorption holes TH1 and TH2 may be covered by the substrate SUB.

The discharge passage EP may be defined in the second area A2 of the lower plate LP. The discharge passage EP may pass through the lower plate LP in the thickness direction. The discharge passage EP may entirely overlap the groove GR in a plan view, and may be connected to the groove GR. In other words, the discharge passage EP may be connected to a bottom of the groove GR, and may pass through the lower plate LP.

As the laser beam LB is radiated to the substrate SUB or the work table for laser processing PT and as the substrate SUB is cut, foreign matter or debris may be generated and accumulated in an inner space of the groove GR. The discharge passage EP may adsorb and discharge the foreign matter or debris from the groove GR.

In an embodiment, a width of the discharge passage EP may be greater than a width of the groove GR in a direction perpendicular to the thickness direction. Accordingly, even in case that a position of the groove GR is moved by moving the second plate PL2, the foreign matter or debris may be removed through the discharge passage EP connected to the groove GR (see FIGS. 3 and 5).

Although FIGS. 3 and 5 illustrate that the work table for laser processing PT includes the discharge passage EP, the disclosure is not limited thereto. For example, the work table for laser processing PT may not include the discharge passage EP.

In the disclosure, the first direction D1 may intersect the second direction D2. For example, the first direction D1 and the second direction D2 may be perpendicular to each other. The third direction D3 may intersect each of the first direction D1 and the second direction D2. For example, the third direction D3 may be a direction between the first direction D1 and the second direction D2. The third direction D3 may be parallel to a plane defined by the first direction D1 and the second direction D2. The fourth direction D4 may intersect each of the first direction D1, the second direction D2, and the third direction D3. For example, the fourth direction D4 may be a direction between the first direction D1 and the second direction D2. The fourth direction D4 may be parallel to a plane defined by the first direction D1 and the second direction D2.

The laser processing apparatus 10 according to an embodiment of the disclosure may include the work table for laser processing PT including the second plate PL2 movable in the second area A2 on the lower plate LP. The groove GR formed corresponding to the cutting line CL of the substrate SUB may be defined on the second plate PL2. In case that a processing shape of the substrate SUB is changed, a process may be performed by moving the second plate PL2 according to the changed processing shape. For example, the process may be performed without replacing the work table for laser processing PT. Therefore, since the work table for laser processing PT may not be replaced for each processing shape of the substrate SUB, cost loss and processing quality problems due to replacement of the work table for laser processing PT may be minimized, and efficiency of the process may be improved.

The disclosure can be applied to a manufacturing process of various display devices. For example, the disclosure may be applicable to a manufacturing process of various display devices such as display devices for vehicles, ships and aircraft, portable communication devices, display devices for exhibition or information transmission, medical display devices, and the like.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A work table for laser processing comprising:

a lower plate including a first area and a second area surrounding at least a portion of the first area;

a first plate disposed in the first area on the lower plate and having a polygonal shape in a plan view; and a second plate disposed in the second area on the lower plate and movable in the second area, wherein a groove to which a laser beam is irradiated is defined on the second plate.

2. The work table for laser processing of claim 1, wherein the second plate includes:

a first control plate disposed adjacent to a first side of the first plate extending in a first direction;

a second control plate disposed adjacent to a second side of the first plate extending in a second direction intersecting the first direction;

a third control plate disposed adjacent to a third side of the first plate facing the first side;

a fourth control plate disposed adjacent to a first corner of the first plate where the first side and the second side meet; and a fifth control plate disposed adjacent to a second corner of the first plate where the second side and the third side meet.

3. The work table for laser processing of claim 2, wherein each of the first control plate and the third control plate is movable in the second direction, the second control plate is movable in the first direction, the fourth control plate is movable in a third direction intersecting each of the first and second directions, and the fifth control plate is movable in a fourth direction intersecting each of the first, second, and third directions.

4. The work table for laser processing of claim 2, further comprising:

a third plate disposed adjacent to a side of the second area on the lower plate.

5. The work table for laser processing of claim 4, wherein each of the first, second, third, fourth, and fifth control plates includes an adjusting bolt.

6. The work table for laser processing of claim 5, wherein the adjusting bolt is connected to the third plate.

7. The work table for laser processing of claim 6, wherein each of the first, second, third, fourth, and fifth control plates is movable in the second area along the adjusting bolt.

8. The work table for laser processing of claim 2, wherein the first, second, third, fourth, and fifth control plates include a ruler that guides the first, second, third, fourth, and fifth control plates, respectively.

9. The work table for laser processing of claim 2, wherein the groove is defined on each of the first, second, third, fourth, and fifth control plates and continuously extends along the first, second, third, fourth, and fifth control plates.

10. The work table for laser processing of claim 1, wherein a plurality of first adsorption holes spaced apart from each other are defined on the first plate.

11. The work table for laser processing of claim 10, wherein a plurality of second adsorption holes adjacent to the first plate and spaced apart from each other are defined on the second plate.

12. The work table for laser processing of claim 11, further comprising:

a chamber disposed inside the lower plate, wherein the chamber is connected to the plurality of first adsorption holes and the plurality of second adsorption holes.

13. The work table for laser processing of claim 1, further comprising:

a discharge passage passing through the lower plate in a thickness direction of the lower plate and disposed in the second area of the lower plate.

14. The work table for laser processing of claim 13, wherein the discharge passage entirely overlaps the groove in a plan view.

15. A laser processing apparatus comprising:

a lower plate including a first area and a second area surrounding at least a portion of the first area;

a first plate disposed in the first area on the lower plate and having a polygonal shape in a plan view;

a second plate disposed in the second area on the lower plate, including a groove, and movable in the second area; and a laser unit that radiates a laser beam along the groove and disposed on the lower plate.

16. The laser processing apparatus of claim 15, wherein the second plate includes:

a first control plate disposed adjacent to a first side of the first plate extending in a first direction;

a second control plate disposed adjacent to a second side of the first plate extending in a second direction intersecting the first direction;

a third control plate disposed adjacent to a third side of the first plate facing the first side;

a fourth control plate disposed adjacent to a first corner of the first plate where the first side and the second side meet; and a fifth control plate disposed adjacent to a second corner of the first plate where the second side and the third side meet.

17. The laser processing apparatus of claim 16, wherein each of the first control plate and the third control plate is movable in the second direction, the second control plate is movable in the first direction, the fourth control plate is movable in a third direction intersecting each of the first and second directions, and the fifth control plate is movable in a fourth direction intersecting each of the first, second, and third directions.

18. The laser processing apparatus of claim 16, wherein each of the first, second, third, fourth, and fifth control plates includes an adjusting bolt.

19. The laser processing apparatus of claim 16, wherein the first, second, third, fourth, and fifth control plates include a ruler that guides the first, second, third, fourth, and fifth control plates, respectively.

* * * * *